United States Patent Office 3,239,521
Patented Mar. 8, 1966

3,239,521
AMORPHOUS QUATERNARY AMMONIUM SILICATES
Helmut Hans Wilhelm Weldes, Havertown, Pa., assignor to Philadelphia Quartz Company, Philadelphia, Pa., a corporation of Pennsylvania
No Drawing. Filed Aug. 15, 1961, Ser. No. 131,490
8 Claims. (Cl. 260—247.7)

INTRODUCTION

This invention generally relates to the production and use of soluble sodium-free hydroxylated organic quaternary nitrogen silicates. In one particular embodiment this invention relates to the production and use of sodium-free tetraethanolammonium silicates and derivatives thereof.

This is a continuation-in-part of my copending application Serial No. 50,877, filed on August 22, 1960.

BACKGROUND

Water-soluble alkali metal silicates are favored components of (1) refractory and rapid-setting cements, (2) inorganic coatings having a refractory or weather-resistant character, and (3) numerous adhesives. However, in certain uses they have drawbacks which are associated with the alkali metal component, and it has long been an objective to prepare a soluble silicate useful in these various fields which is free of any alkali metal component. For instance, in a refractory cement the presence of the alkali metal salt lowers the softening point of the cement because of the fluxing characteristic of the salt. Efforts to overcome this have been made by increasing the silica ratio of the soluble silicate but some alkali metal salt always remains even after neutralization and excessive washing. Furthermore, the alkali metal silicate solutions increase in viscosity rapidly as the concentration increases at high silica ratios so that in commercial solutions prepared at about the 4.0SiO$_2$:Na$_2$O ratio the solid content will be no higher than 30%. Furthermore, where the silica ratio is high, the softening point of the anhydrous sodium silicate also is high.

One aspect of this invention broadly involves the discovery of soluble amorphous sodium-free organic N-containing silicates which overcome the aforementioned drawbacks of soluble alkali metal silicates. In another specific aspect of the invention, I believe that I am the first person to discover sodium-free tetraethanolammonium silicate and methods for producing same. The tetraethanolammonium silicate which I have discovered does not appear to crystallize readily since I have not been able to obtain crystals after many attempts.

THE INVENTION

This invention broadly encompasses amorphous compositions having the general oxide formula with continuously variable ratios:

$$X(N_nR_p{}^s)_2O \cdot YSiO_2 \cdot ZH_2O$$

In the above formula:

N represents a nitrogen atom;

$n$ is a small integer, less than 10 and preferably less than five;

X, Y and Z represent numbers defining the relative amounts of each of the component parts of the compound. X is 1, Y is preferably between 0.5 and 20, and Z is preferably between 0 and 99, and wherein up to four R groups are associated with each N;

R represents alkyl radicals containing between about 1 and 20 carbon atoms, at least two of which are omega hydroxy alkyl groups (preferably two or more of these R groups are ethanol groups and the others derivatives of ethanol groups);

$p$ is at least 4, indicating total R groups; and $s$ is an integer from 1 to p, indicating the number of different types of R groups.

According to one specific embodiment the invention relates to the production of amorphous compositions having the formula:

$$X(NR^1R^2R^3R^4)_2O \cdot YSiO_2 \cdot ZH_2O$$

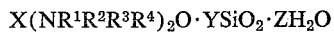

wherein N, X, Y and Z have the significances noted above and R$^1$, R$^2$, R$^3$ and R$^4$ represent alkanol radicals containing between about 1 and 20 carbon atoms.

The tetraethanolammonium silicates of this invention can form aqueous solutions of over 50% solids content at viscosities at which the solution is readily useful (such as 2 poises). Such solutions may have as high as 15 moles of SiO$_2$ to 1 mole of organic alkali (i.e. the organic base) and yet be readily soluble and have a relatively low melting point which is representative of organic compounds rather than the inorganic salts. The organic base portion can be readily removed, leaving a silica cement in place. This may be accomplished either by heating or by neutralization and removal of the soluble organic base salt. Thus, this new compound and its derivatives have an important place in the formulation of refractory and rapid-setting cements as well as in coatings for roofing granules and shingles, in special adhesives, in investment molds for casting metals, and the like.

I have found that tetraethanolammonium silicates and their derivatives form stable, water-free compositions which are easily soluble in water. These compositions have a range of mole ratio of SiO$_2$ to quaternary ion from about 0.5 to 1.0 (i.e. a mol ratio of SiO$_2$ to quaternary oxide off about 1 to 2), or lower, to about 15 to 1 (i.e. about 30 to 1 on the quaternary oxide ratio), or higher. These pure compositions vary from viscous oily liquids at the lower ratios to pliable solids in the higher range and, finally, to brittle solids. At a ratio of about 21, the dehydrated solid becomes insoluble. These compositions below about ratio 15 are miscible in all proportions with water. The silica is present in aqueous solutions of such compositions largely as crystalloidal silica under equilibrium conditions. They have a relatively high pH but a viscosity much lower than that of a sodium silicate solution having a similar solids content and silica ratio. Soluble silicate solutions above a molecular ratio of 4.0 are so difficult and costly to manufacture and so relatively unstable at high concentrations that they have never been commercially available. Thus, in the sodium system a ratio of 4.0 has been considered the maximum. As pointed out above, this 4.0 ratio material can be concentrated usefully only to about 30% solids whereas the 12 ratio organic base silicate will readily form solutions of reasonable viscosity at more than 50% solids content.

METHODS OF PREPARATION

The compounds of this invention may be prepared in a number of ways. Such methods include, for example:

(a) Removing the alkali metal ion from alkali metal hydroxylated quaternary ammonium silicates by use of a suitable base exchange resin;

(b) Dissolving sodium-free silica in sodium-free hydroxylated organic quaternary ammonium bases;

(c) Dissolving sodium-free silica in sodium free tetraethanolammonium silicate solutions;

(d) The sodium may be leached from the less soluble sodium hydroxylated quaternary ammonium silicate crystals;

(e) Reacting ammonia or an amine and ethylene oxide with finely divided silica hydrate or silica gel, or a colloidal silica sol.

The following examples are illustrative of the invention.

Example 1
PREPARATION OF TETRAETHANOLAMMONIUM HYDROXIDE (TEAH)

It is possible to prepare a pure tetraethanolammonium hydroxide (TEAH) directly from ammonia and ethylene oxide using an alkali silicate as a catalyst. This, 10 parts of "E" sodium silicate as catalyst were mixed with 300 parts of water and 24 parts of concentrated ammonium hydroxide solution containing 29% $NH_3$. These components were mixed in an open flask having a low-temperature reflux condenser and the reaction was allowed to proceed at its own rate with the ethylene oxide (74 parts) added gradually to the reaction mixture at room temperature. The temperature at the start was 24° C. and the solution was clear. In six minutes at 25° C., the ethylene oxide had also warmed to 25° C. and was being added slowly. Two minutes later, the temperature rose to 27° C. without any refluxing occurring. At nine minutes, the temperature was 28° C. and although no refluxing was occurring, the reaction mixture was kept cool by cooling the outside of the flask. At 12 minutes, the temperature was still 28° C. At 17 minutes, the temperature had risen a half a degree and the mixture was refluxing very slowly. At 46 minutes, the temperature was 28° C. and all the ethylene oxide had gone over into the mixture which was clear. At 72 minutes refluxing had stopped but the temperature was the same. After 6.25 hours, the temperature was 26° C. and the reaction had stopped. There was still an odor of ammonia, but neither ammonia nor ethylene oxide could be detected the next morning. The solution was then distilled in a vacuum of 16 mm. of mercury until 312 parts of water was lost and distillation was continued at about three mm. Hg with a loss of 2.3 parts of water. The remaining 92 parts was a clear and highly viscous solution. Four hundred and forty parts by volume of methanol were added, mixed in well and left over the weekend. Precipitated material which contained the soda and silica was filtered off and the solution was made up to 500 parts by volume with methanol and titrated electrometrically. The clear and highly viscous solution was found to consist of about 41% of tetraethanolammonium hydroxide and 28% of triethanolamine which could be separated by known means.

Example 1A
PREPARATION OF SODIUM-FREE TETRAETHANOLAMMONIUM SILICATE FROM TEAH The sodium-free tetraethanolammonium hydroxide formed in accordance with Example 1 was found to dissolve sodium-free silica with the resultant formation of a sodium-free tetraethanolammonium silicate (TEAS).

Example 2
PREPARATION OF CRYSTALLINE MASS OF SODIUM SALT OF TEAS

In this example a sodium-free TEAS is formed by preparing a sodium TEAS and then removing the sodium ion by means of base exchange resins. The preferable means of preparing such sodium TEAS is by reacting an alkali silicate with concentrated ammonium hydroxide and ethylene oxide.

It is possible to obtain about 100% yield of sodium tetraethanolammonium silicate based on silica, if the alkali metal silicate employed has a $Na_2O:SiO_2$ ratio generally corresponding to the $Na_2O:SiO_2$ ratio of the final tetraethanolammonium silicate. Thus, 250 parts of "S-35" sodium silicate (1:3.75 $Na_2O:SiO_2$ ratio) were diluted with 300 parts of water and mixed with 24 parts of concentrated ammonium hydroxide containing 29% $NH_3$. To these were added 16 parts of "Kasil #1" to speed up the formation of crystals.

The reaction was again carried out at 25-30° C. in the reaction flask with 74 parts of ethylene oxide allowed to enter the reaction zone slowly in order to control the reaction temperature. At the same time, the flask was cooled externally. In this way, a clear reaction solution was obtained and 414 parts of water were distilled off, leaving a viscous clear liquid. This was agitated in an ice bath for six hours. During this time, it turned into a semi-solid crystalline mass which was dried in a vacuum desiccator for 30 hours.

The crystalline material was ground and analyzed, showing 100% yield based on $SiO_2$ and 84.5% based on either ethylene oxide or ammonia. The final ratio was

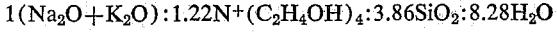

This corresponds to a ratio of

Example 2A
PREPARATION BY SPRAY DRYING

Reaction mixtures similar to those described in Example 2 were prepared and a similar product formed by spray drying the solution instead of allowing it to crystallize in a cake. By spray drying, the necessity of grinding was avoided.

In one such spray drying case the amount of dilution water was sharply reduced from 300 to 60 parts in the formula given above (Example 2). The preparation and crystallization of this mixture was carried out satisfactorily and the mass was spray dried using a ring-type nozzle with six openings around the center, placed at the top of a 38-inch conventional spray drier. (A fluid atomizing research type spray drier from the Swenson Corp. of Harvey, Illinois.) Best results were obtained with an air inlet temperature of 420–430° C. and an outlet temperature of 80–90° C. The atomizing air pressure was 75 p.s.i. and the slurry pressure was 50 p.s.i. 69 parts of product were obtained having the formula $1M_2O:1.3$ tetraethanolammonium ion:$3.9SiO_2:3.3H_2O$. This corresponds to $1M_2O:0.65$ tetraethanolammonium oxide:$3.9SiO_2:3.3H_2O$. The lower water content is probably related to the higher melting point which was found to be 108° S. The product decomposed at 173° C.

Example 2B
PREPARATION OF SODIUM-FREE TEAS

A pure TEAS was formed by removing the sodium from the sodium containing TEAS crystals of Example 2A.

In order to carry out this separation, I obtained a highly cross-linked polystyrene nuclear sulfonic acid type cation exchanger, known as Amberlite 124, from Rohm & Haas Co. This was in the sodium form and had an exchange capacity of 2.1 meq./ml. of wet resin. This was converted to the H-form by treating it with an excess of 0.5 N HCl and washing it free from excess hydrogen with de-ionized water. 47.6 ml. of this hydrogen ion form of the resin was put in a column with a diameter of 1.7 cm. and then a solution of 10 grams of the sodium tetraethanolammonium silicate dissolved in 1 liter of water was run through the column very rapidly. The column was then regenerated with 300 ml. of 0.5 N HCl. In this way the resin was saturated with quaternary ion and sensitized for the absorption of sodium ion only.

With the column so prepared, 30 grams of the same sodium tetraethanolammonium silicate (prepared according to Examples 2, 2A and 2B) were dissolved in 200 ml. of water, and this was run through the column as fast as possible which took about 3 minutes. The effluent was distilled in vacuo at 40° C. until a very viscous, oily material was left. This had an ignition loss of 78.22% with 15.05% as the quaternary ion, $H_2O$ by difference was 63.17% and the silica content was 20.06%. The $Na_2O$ content was 1.07% so that a fairly pure tetraethanolammonium silicate had been formed which did not crystallize even on refrigeration. This composition corresponds to the following oxide ratio: 1 quaternary ammonium oxide:8.6SiO$_2$9.6H$_2$O+(0.44Na$_2$O).

*Example 3*

PREPARATION OF SODIUM-FREE HYDROXYLATED ORGANIC AMMONIUM SILICATES

In Example 2B the preparation of a tetraethanolammonium silicate by removal of sodium by base exchange is described. It is also possible to form a pure sodium-free hydroxylated organic ammonium silicate by reaction of ammonia and ethylene oxide and a finely divided silica, such as Quso-FF or a colloidal sol, such as Ludox.

Moreover, since more than a trace of silica is required to bring about the reaction for the formation of the sodium-free hydroxylated organic ammonium silicate, it does appear that the silica enters into the reaction and that it is not a mere formation of the tetraethanolammonium hydroxide with a subsequent solution of the silica present. Thus I appear to have a new process and a new product.

Examples 3 and 4 are presented to show that the reaction between ammonia and ethylene oxide occurs in the presence of silica either as a finely divided solid or as an alkali free sol. The product obtained with the finely divided silica, Quso-FF, is a hydroxylated quaternary ammonium silicate containing a quaternary ammonium radical of an unexpectedly high molecular weight. It is an oil, soluble in water and methanol, but insoluble in other common organic solvents. Solutions of quaternary ammonium silicates containing 10 to 15% by weight of SiO$_2$ can be prepared in this way. The reaction with the colloidal silica sol Ludox leads to a quaternary ammonium silicate also substantially free of inorganic alkali but with a lower molecular weight quaternary ion. This is obtained with good yield provided the silica is present in a substantial amount. The oily material obtained from this reaction is soluble in water. Additionally, the product of the sol reaction contains a larger amount of colloidal silica than crystalloidal silica but on standing the colloidal silica tends to change over into the crystalloidal form and the opalescence of the solution becomes less.

As a specific instance, finely divided silica, Quso-FF, was used in the following formula:

550 grams of water were blended with 79 grams of Quso-FF and then with 24 grams of aqueous ammonia (29%). This blend was poured into a 1 liter autoclave equipped with a stirrer and connected to a low temperature reflux condenser through a valve. The autoclave was also connected to a flask containing 74 g. of ethylene oxide. The ethylene oxide was distilled into the reaction mixture while it was being agitated vigorously at a temperature held between 25 and 30° C. In about an hour and a half all the ethylene oxide had been distilled over and the autoclave was closed but agitation was continued for a total of 4 days. Any undissolved Quso-FF was filtered on a Buchner funnel with filter paper and carbon black. The product was designated as solution A and had a mol ratio of 1 quaternary ion to 1.22 of SiO$_2$ at a pH of about 13. This corresponds to an oxide ratio of 1 quaternary ammonium oxide to 2.44 SiO$_2$.

Part of solution A was concentrated in vacuo at 40° C. (136 grams of water were removed from a total of 168 grams) leaving a very viscous, clear, slightly yellowish solution B (containing 39.15% quaternary ion, 15.85% SiO$_2$ and 45% water). This solution B was then further evacuated at 43° C. and 5½ more grams of water were removed, leaving 27.3 grams of a very viscous, clear oil. Most of this oil (C) dissolved very quickly in methanol but not in other organic solvents. Residual silica was filtered out as before. Solutions of various concentrations in methanol could be obtained by distillation.

Because of the interference of the silicate ion in the analytical procedure, it was necessary to analyze these mixtures by a rather complex procedure. An excess of 2 N HCl was added, precipitating out all the SiO$_2$ and converting the amine to the chlorides. This mixture was then diluted with water and the silica was filtered out. The amine chlorides were titrated electrometrically with standardized alkali such as 0.2 N sodium hydroxide. It was thus possible to differentiate between different amines. By this means it was found that oil, such as (C) above, contained 31.2% of quaternary ammonium ion calculated as N$^+$(C$_2$H$_4$OH)$_4$ and 9.5% of triethanolamine. By treatment with cationic and anionic exchangers it was found that all the organic groups were attached to amines and that, therefore, a high molecular weight ethylene oxide compound was involved which had a molecular weight of 458. On this basis the oil was found to contain 73.65% of quaternary ion, 15.15% of SiO$_2$ and 9.47% of triethanolamine. This corresponds to the oxide ratio, omitting the triethanolamine, of

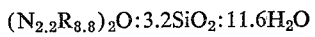

$(N_{2.2}R_{8.8})_2O:3.2SiO_2:11.6H_2O$

*Example 4*

PREPARATION OF SODIUM-FREE HYDROXYLATED ORGANIC AMMONIUM SILICATES

Another reaction using Ludox LS, 222 grams, was carried out with 24 grams of aqueous ammonia and 74 grams of ethylene oxide.

In carrying out the reaction, the ammonia was mixed with the Ludox in a reaction flask equipped with a stirrer and a thermometer, and the ethylene oxide was distilled into the mixture over a period of about 1 hour. Agitation was continued for about 7 hours more, but the solution remained in the flask overnight. The solution obtained contained 21.0% of quaternary ion, 21.6% of SiO$_2$ and 57.5% of H$_2$O; with the quaternary ion present as N$^+$(C$_2$H$_4$OH)$_4$; 83.1% conversion to this material was obtained. At first there was only 0.24% of crystalloidal silica, and 21.3% of colloidal silica, but after 4 days there was 4.5% crystalloidal silica and in 18 days, 6.8% crystalloidal silica and 14.8% colloidal SiO$_2$.

An oil obtained by distilling the water from this mixture in vacuo at 40° C. was viscous but clear. It contained 43.45% of quaternary ion and 39.85% of SiO$_2$. This corresponds to [N(C$_2$H$_4$OH)$_4$]$_2$O:5.9SiO$_2$:8.3H$_2$O.

*Example 5*

PREPARATION OF SODIUM-FREE HYDROXYLATED ORGANIC AMMONIUM SILICATES

In this reaction 79 grams of Quso-FF were blended with 550 grams of water, and 24 grams of 29% aqueous ammonia were added to this mixture. Instead of using an autoclave for the reaction, as in Example 3, these were combined in a glass flask equipped with a stirrer and connected through one valve to a low-temperature reflux condenser, and through another valve to a flask of ethylene oxide. The ethylene oxide was distilled into the vigorously agitated mixture while the temperature was held between 25 and 30° C. 74 grams of ethylene oxide were added over a period of 55 minutes. At the start, the slurry was milky. The reaction was allowed to continue for another 7 hours and then left overnight at room temperature. At the end of 7 hours the solution was a thin, milky liquid with a slight odor of ethylene oxide which had disappeared by the next morning. The mixture was filtered on a Buchner funnel through a bed of carbon black and the clear filtrate diluted to 500 parts with water. Since no other alkali was present, the organic ion was determined as the total titratable alkali. Electrometric titration agreed with this value. The silica was determined by volumetric titration using the standard molybdate colorimetric method. Since the silica was completely crystalloidal, the same result was obtained whether or not NaOH was used in the procedure. The solution contained 0.84% silica and 5.66% of quaternary ion, thus having a mole ratio of 0.48SiO$_2$:1.0 quaternary. This corresponds to an oxide ratio of 0.96SiO$_2$:1.0 quaternary ammonium oxide.

Example 6

PREPARATION OF SODIUM-FREE HYDROXYLATED ORGANIC AMMONIUM SILICATES

In a reaction flask equipped with a stirrer, thermometer, a low-temperature reflux condenser and a gas inlet tube, 30 grams of aqueous 29% NH$_3$ solution were admixed with 1110 grams of Ludox LS. No gelation or coacervation occurred, and 92.5 grams of ethylene oxide were distilled into the agitated mixture through the gas inlet tube. The temperature was maintained between 24 and 26.5° C. The ethylene oxide was distilled over in the course of about one hour, and the reaction was continued for 6 more hours and then left at room temperature overnight in a closed vessel. The next morning the water was distilled off by vacuum distillation. Part of the solution was removed when it contained 50% SiO$_2$ and the remainder was taken to dryness.

In the 50% solution, the analysis was 14.39% of quaternary ion and 52.53% of SiO$_2$ with a mole ratio of 11.81 of SiO$_2$:1.0 of quaternary ion. This solution has a specific gravity at 20°/20° of 1.512 and a viscosity at 20° C. of 2.8 poise. The material taken to dryness was solid but easily soluble in water, even though the mole ratio was 11.81 SiO$_2$ to 1 of quaternary ion. This corresponds to a ratio of 1.0 quaternary ammonium oxide:23.6SiO$_2$:49.8H$_2$O. It was not soluble in methanol or ordinary organic solvents. With increasing silica ratio the solubility in methanol declines.

Following the same procedure, a composition having a mole ratio of about 21 was prepared by allowing 444 grams of Ludox HS, 6 grams of aqueous 29% NH$_3$ and 18.5 grams of ethylene oxide to react. After the reaction was completed and the mixture contained in a closed vessel overnight, the water was distilled off. This left a solid, white material which was very brittle and easily broken into small particles. It appeared to be insoluble in water. Thus, the limiting ratio at which the solid anhydrous material was completely miscible with water is probably about 15 to 16.

Example 7

SODIUM-N,N',N'-TETRA-(2-HYDROXYETHYL)-PIPERAZINIUM SILICATE

A sodium - N,N',N'-tetra-(2 - hydroxyethyl) - piperazinium silicate may be prepared either from N,N'-bis-(2-hydroxyethyl)-piperazine with sodium silicate and 2 moles of ethylene oxide, or from unsubstituted piperazine and 4 moles of ethylene oxide with the sodium silicate. Such a reaction was carried out by dissolving 34 grams of the N,N'-bis-(2-hydroxyethyl)-piperazine in 300 grams of water and mixing this with 240 grams of "E" sodium silicate in the reaction flask. The reaction was carried out between 23 and 30° C. beginning at the lower temperature with a clear, yellowish solution. The 36 parts ethylene oxide was distilled over in 52 minutes, forming a heavy coacervate which dissolved in about 20 minutes. The reaction was allowed to continue for about 6 hours at which time it was again a clear, yellowish solution. This solution was kept overnight and crystals had begun to form at that time. 260 grams of water were distilled off and the final mixture of crystals and solution was put in a refrigerator at about 2° C. overnight. Crystals were then filtered off and were washed four times with water. This product had an ignited loss of 74.91% and contained 44.08% of quaternary ion, 30.83% of water, 24.16% of SiO$_2$ with 1.01% of Na$_2$O. When these crystals were washed with alcohol instead of water, the Na$_2$O content was about 4.5%. The product containing 1% of Na$_2$O had no real melting point but became damp at about 115° C. and turned brown without melting at about 120° C.

When the product was washed 10 additional times, with a total of 1500 ml. of water to 5 grams of the product, the residue was found to have an ignited loss of 72.85% with 35.31% of quaternary, 37.54% of H$_2$O and 26.41% of SiO$_2$ with only 0.09% of Na$_2$O. Thus this product has a mole ratio of 3.3 SiO$_2$ to 1.0 of quaternary ion and 15.6 moles of H$_2$O. Since the quaternary ammonium ion contains two basic nitrogens the oxide ratio has exactly the same ratio as the ion ratio, that is 1 quaternary ammonium oxide:3.3SiO$_2$:15.6H$_2$O. It decomposes without melting at 118° C. This final product is somewhat soluble in water and gives a solution with a pH of about 10.5

Example 8

N,N-BIS-(β-HYDROXYETHYL) MORPHOLINIUM SILICATE

A solution of 29 grams morpholine in 534 grams Ludox was placed into a three-necked flask equipped with stirrer, low-temperature reflux condenser, inside thermometer, and gas inlet tube. Ethylene oxide (29.4 grams) was introduced over a period of 19 minutes into the agitated mixture. The temperature of the mixture rose rapidly and was kept between 25° and 30° C. by cooling the reaction flask. Agitation was continued for 3 hours and the mixture kept in a closed vessel at room temperature overnight. Then all the water was removed by distillation in vacuo at temperatures below 40° C. The residue, a dry, white, very brittle solid had an analysis of 29.81% quaternary and 69.44% SiO$_2$, and a mole ratio of 1 quaternary:6.84SiO$_2$. This corresponds to an oxide ratio of 1 quaternary ammonium oxide to 13.68SiO$_2$. It was very easily soluble in water.

Example 9

HEXAKIS-(β-HYDROXYETHYL) ETHYLENE DIAMMONIUM SILICATE

The reaction was carried out in exactly the same way as described for Example 8 using 70 grams tetrahydroxyethyl ethylene diamine, 475 grams Ludox, and 26.1 grams ethylene oxide. The residue, a transparent, slightly tacky solid, contained 38.86% quaternary, 56.41% SiO$_2$, and had a mole ratio of 1 quaternary:7.9SiO$_2$. Because the quaternary ion includes 2 quaternary nitrogens, the oxide and ion ratios are identical. It also was easily soluble in water.

A number of the materials used in the preceding examples are described as follows:

The alkali metal silicates, supplied by the Philadelphia Quartz Co., are characterized in the following table:

| Trademark | Ratio, percent, Na$_2$O:SiO$_2$ | Na$_2$O, percent | SiO$_2$, percent | H$_2$O, percent |
|---|---|---|---|---|
| S 35 | 1:3.75 | 6.75 | 25.3 | 67.9 |
| E | 1:3.22 | 8.60 | 27.7 | 63.6 |
| | (K$_2$O:SiO$_2$) | (K$_2$O) | | |
| Kasil #1 | 1:2.50 | 8.30 | 20.8 | 70.5 |

Ammonium hydroxide was the 28–30% aqueous reagent grade supplied by Allied Chemical Co.

Quso-FF, a finely divided silica, also obtained from the Philadelphia Quartz Company, has an ignited loss of 13.0%, with 7.2% of free water and 5.8% of bound water. It analyzed approximately 85% SiO$_2$, with a surface area of about 280 m.$^2$/g.

Two colloidal silica sols sold by the Du Pont de Nemours Co. as Ludox HS and Ludox LS has the following composition:

| Physical Properties | Ludox HS | Ludox LS |
|---|---|---|
| Percent Colloidal silica as SiO$_2$ | 30 | 30 |
| Ratio, wt. SiO$_2$/Na$_2$O | 95 | 285 |
| Viscosity at 25° C, cps | 3.6 | 13 |
| pH at 25° C | 9.8 | 8.4 |
| Surface area (BET), m.$^2$/g | 210 | 210 |
| Particle diameter, mμ | 15 | 15 |
| Chloride as NaCl, percent | 0.04 | 0.002 |
| Sulfate as Na$_2$SO$_4$, percent | 0.05 | 0.006 |

The ethylene oxide with a purity of about 99.5% was supplied by Matheson Company, Inc.

Tetraethanolammonium hydroxide was supplied by Carbide & Carbon Chemicals Company in 1945 as an aqueous solution containing 40% tetraethanolammonium hydroxide (1.96 N), 12.16% $Na_2O$ and 0.29% $CO_2$ and by the R.S.A. Corporation of New York as a 40% methanolic solution.

ANALYTICAL PROCEDURES

In analyzing the quaternary ammonium silicates, special procedures are necessary.

Ignition loss

The ignition loss is determined with a sample of quaternary silicate weighing one gram. This sample is heated in a covered platinum crucible, raising the temperature very, very slowly. If the ignition is carried out too fast, silicon carbide forms and it is almost impossible to burn it off. Therefore the crucible is heated extremely slowly on one side until all of the organic matter has charred completely. This procedure takes about one hour, then the heat is increased slowly to the full blast of a Tirrill burner and continued until the sample has turned completely to either white powder or a clear white melt. This takes about two more hours. When the sample is white in color it is transferred to a Fisher burner and heated full blast for a further half hour.

Quaternary ammonium base

The nitrogen content is determined using the Kjeldahl procedure with special modifications as indicated. About 0.75 gram of the silicate are taken as a sample. This sample is weighed into a 500 ml. round-bottom, two-necked flask and 10 grams of dehydrated $K_2SO_4$ and 2 grams of dehydrated $CuSO_4$ are added thereto. After admixing 12 ml. of concentrated $H_2SO_4$, a reflux glass tube is set on top of the flask and the mixture heated over a wire gauze in a hood slowly and cautiously, close to the boiling point of the sulfuric acid. Heating is continued until the originally dark solution becomes clear and no dark specks remain. This digestion period takes between 3 to 24 hours, depending on the composition. After the contents are cooled to room temperature, 100 ml. distilled water is added carefully through the reflux tube while swirling the contents. Then a few Alundum boiling stones are added and a magnetic stirrer. The reflux glass tube is removed and the flask is connected to the distillation equipment. The end of the condenser dips into a receiver containing 100 ml. of distilled water with excess 0.2 normal HCl over the expected equivalent of ammonia. About 130 ml. of 6-normal sodium hydroxide are added to the reaction flask through a dropping funnel while stirring with a magnetic stirrer. When all of the sodium hydroxide is added, the reaction mixture is heated for an hour to vigorous boiling. The ammonia formed during the digestion is driven over into the acid solution and after completion the free hydrochloric acid is back titrated with 0.2-normal NaOH.

Silica determination

Silica in solution may be determined using the usual volumetric method and the gravimetric method may be used for insoluble silica (Vail, Soluble Silicates, vol. I, p. 40).

PRODUCT PROPERTIES

Viscosity

The aqueous solutions of the sodium-free products in accordance with this invention are quite alkaline and concentrated solutions are quite viscous. For instance, a solution of 74% of a tetraethanolammonium silicate having a ratio of 0.53 $SiO_2$ to quaternary ion (i.e., 1.06 $SiO_2$ to 1 quaternary ammonium oxide) had a pH of 12.8 and a viscosity at 20° C. of 8.0 poises. At 50° C. the viscosity had dropped to 1.1 poises. On the other hand, a solution of a product containing 70% of 8.7 ratio ($SiO_2$ to quaternary ion or 17.4 $SiO_2$ to quaternary ammonium oxide) material with 30% of water had a pH of 11.08 and a viscosity at 20° C. of 14.1 poises; at 50° C. the viscosity was 6.0 poises. A solution containing 50% silica prepared from a tetraethanolammonium silicate of the mole ratio of 11.8 $SiO_2$ to 1.0 quaternary ion (or 23.6 $SiO_2$ to 1 quaternary ammonium oxide) had a viscosity at 20° C. of 2.8 poises.

Gelation vs. pH

A sodium-free quaternary tetraethanolammonium silicate having a ratio of 2.74$SiO_2$:1.0 quaternary ion (or 5.48 $SiO_2$ to 1 quaternary ammonium oxide) and a concentration of 42.08% $SiO_2$ was diluted with water to 30% $SiO_2$ and gradually neutralized with sulphuric acid. The initial pH was 11.3. At a pH of about 10.5, the mixture became very viscous but did not gel, and gradually the pH rose again to 10.8 during the course of 24 hours. When this was again reduced to a pH of 10.5, the mixture appeared to gel in about 2 to 4 minutes but reliquefied overnight, forming a clear, very viscous solution. Again, at a pH of 10.4, a gel-like structure formed after 1.5 minutes, but this also reliquefied after 4 days, forming a clear and viscous solution. At a pH of 9.85 a gel formed which did not redissolve or reliquefy over a period of more than 2 weeks.

On the other hand, a 3% solution was treated with 3% $H_2SO_4$ with a pH lowered gradually to about 2. In these solutions no gel formed, but rather a finely divided silica. This lack of gelation must be related to the fact that the silica in these solutions is crystalloidal rather than colloidal.

Films

A sodium-free tetraethanolammonium silicate having a mole ratio of 8.7 $SiO_2$ (or 17.4 $SiO_2$ to 1 quaternary ammonium oxide) had a concentration of 45.7% $SiO_2$ and 17.02% of quaternary. Films were cast on small metal dishes and dried at room temperature, 100°, 200°, 400° and 800° C. The weight loss and solubility of these films were determined. The alkali in the films remained quite soluble even after drying at 100° C., but on drying to 200° C., and especially above 200° C., much less alkali could be dissolved out. The silica in these films, even those dried at room temperature, was rather insoluble. The amount of silica dissolved by boiling 2.5 grams of a film dried at room temperature in 50 ml. of water 15 minutes was 2.7%. This was reduced to 1.2% after heating at 400°, and to less than 1% after heating at 800°.

A more alkaline material having a ratio of 4.8 (or 9.6 $SiO_2$ to 1 quaternary ammonium oxide) was used as a solution containing 41.0% $SiO_2$ and 27.55% of quaternary ion. 59% of the silica was soluble after drying at 100° but after drying at 200° only 2.6% was soluble, and at 400°, and higher, less than 1% was soluble. These films had no adhesion to metal or glass. The quaternary ion was soluble in both films after curing at 100° C. At 200° C., and above, it appears that the organic ion breaks down and evaporates to some extent. About 50% was lost by curing 30 minutes at 200° C., and this appears to be more noticeable in the ratios containing higher quaternary nitrogen alkali.

The more siliceous films crack completely when dried at room temperature for 16 hours, whereas low ratio films, for instance those having a ratio of about 4, form hard, smooth surfaces at room temperature which do not change for almost 4 days, at which time a light cracking around the edges is observed. Neither do they crack at 100° C. However, on curing at 200° C. these films do crack and turn tan in 5 minutes. The films all break down and turn brown when cured at 400° C. and cannot be scrubbed off the plates.

The film stability may be increased by adding material such as urea or Polyox WSR–35, a high molecular weight ethylene oxide polymer sold by Union Carbide Chemicals Co. Glycerine was also good in the more alkaline ratio materials. The same may be said for cane sugar, sorbitol and hexamethylenetetramine.

*Adhesives*

An adhesive solution was prepared from a sodium-free tetraethanolammonium silicate having a silica ratio of 5.44 (or 10.9 $SiO_2$ to 1 quaternary ammonium oxide), with a total solids content of 68.27%. The viscosity at 20° C. was 2.33, and the pH was 11.4. After setting at room temperature, B flute single face kraft board bonded with this adhesive had a pin adhesion strength of 43.4 pounds per 12 inches of flute tip. Setting the bond at higher temperatures reduced this strength as, for instance, at 94° C. the strength was only 37.4 lbs., and at 232° C. the strength was only 8 lbs. per 12 inches of flute tip. In all cases, the wet strength was less than one-half pound.

Apparently because of the crystalloidal nature of the solutions, those solutions having higher silica ratios gave weaker bonds.

*The use of quaternary ammonium silicates for water treatment*

For some time in the water treatment field there has been a need for a soluble silicate which could be used in the form of dry feed for the formation of activated silica sols applicable as coagulant aids in the treatment of raw and waste waters. It has now been found that dry soluble silicates of both the sodium tetraethanolammonium silicate and the sodium-free tetraethanolammonium silicate, as well as other organic silicates of similar type, are very effective in the formation of sols which act as coagulant aids. It is expected that acid salts could be combined with these solid organic alkalies and, if desirable, clay or other forms of weighting agent might be added, thus forming a prepared dry material to be used with dry feed equipment in the formation of coagulant aids based on activated silica. Such a formulation would make unnecessary the purchase of expensive units now required for the preparation of sols from liquid raw materials.

I have found that the sodium tetraethanolammonium silicate produces activated sols which are quite as effective as the normal N-Sols (trademark of Philadelphia Quartz Company) now used by the industry. The sodium-free quaternary ammonium silicate sols which I have prepared are not quite as active but there is no reason why properly formulated sols of this type would not be quite satisfactory. Materials of higher silica ratio and those with quaternary ammonium units having high molecular weight are even more useful in this way.

In the following tests the activities of the sols are compared with a standard activated silica sol, known as "N-Sol A" prepared by reaction of ammonium sulfate with sodium silicate. In the tests alum and the activated sol was added to a one liter portion of a suspension of clay in tap water. Conditions of agitation and the time intervals were kept constant. After proper flocculation, the mixing was stopped and the floc allowed to settle for just 60 seconds. The sample was then withdrawn from a level about 1.75 inches below the surface. The sample was transferred to a clean bottle and vigorously mixed. Turbidity was measured with a Klett-Summerson colorimeter (40 mm. cell, blue filter, distilled water with percent transmittance of 100). Colorimeter readings were converted to transmittance values so that the higher the reading the better the flocculation.

With 36 p.p.m. of $SiO_2$ as N-Sol A and 60 p.p.m. of alum, values of 97–99 were obtained. In these tests the silica sol was added first and mixed with the turbid water for 30 seconds before the alum was added.

It was found that when using the quaternary ammonium silicates as sources of silica (either the sodium-free or the sodium-containing silicates) aging time had no significance. Portions aged for 25 minutes gave as good a flocculation as those aged for 90 minutes and, in fact, when the solution of silicate and acid were added simultaneously so that the tips of the tubes were placed close together just below the surface of the solution, very good flocculation results were obtained without any aging time whatsoever. If the tips of the tubes were separated, so that immediate mixing was not obtained, then results were not as satisfactory. It was, of course, necessary to balance the volume of acid and organic silicate solution in order to get the proper neutralization. For instance, when the solutions were allowed to flow at the rate of 0.86 ml. of 3% $H_2SO_4$ and 1.2 ml. of crystalline sodium tetraethanolammonium silicate containing 3% $SiO_2$ added simultaneously in close juxtaposition to provide 36 p.p.m. of $SiO_2$ and subsequently alum was added to provide 60 p.p.m. of alum, a percent transmission of 97.7 was obtained.

In more standard procedure where the same solution of the sodium tetraethanolammonium silicate was neutralized to a pH of 4.6 using sulfuric acid and allowed to age 25 minutes, a transmittance of 99.0 was obtained, whereas after aging for 90 minutes a transmittance of 99.3 was obtained. On the other hand, when the pH was 9.68 the transmittance was 99.0, after aging for 25 minutes.

A similar sodium tetraethanolammonium silicate which had been spray dried and then made up to a solution containing 3% $SiO_2$ at a pH of 4.3 and aged 25 minutes, exhibited a transmittance of 99.3 in a solution containing 60 p.p.m. of alum and 36 p.p.m. of $SiO_2$.

A sodium-free quaternary ammonium silicate having a ratio of 2.74 $SiO_2$ to 1 mole of tetraethanolammonium ion (or 5.48 $SiO_2$ to 1 tetraethanolammonium oxide) prepared in a 3% solution at a pH of 4.85, developed a transmittance of 85, and at a pH of 8.55 after aging for 90 minutes had a transmittance of 97.5.

A similar material, but with a ratio of 9.44 and a pH of 6.9, developed a transmittance of 84.3 after aging for 25 minutes.

The alkali metal silicates and alkali metal quaternary ammonium silicates will form stable solutions with insignificant amounts of most water miscible organic solvents. For instance, a solution of sodium silicate having a mole ratio of $1Na_2O:3.22SiO_2$ and containing 15% $SiO_2$ will accept only about 0.5% of either methanol, ethanol, isopropanol, acetone, dioxane or tetrahydrofuran. A sodium tetraethanolammonium silicate with a mole ratio of $1Na_2O:1.1$ quaternary ion:$3.9SiO_2$ (or $1Na_2O:0.55$ quaternary ammonium oxide:$3.9SiO_2$) in an aqueous solution with 15% $SiO_2$ will accept less than 1% of the above water miscible solvents. On the other hand, alkali free tetraethanolammonium silicates with mole ratios varying from 1 quaternary ion:$2.74SiO_2$ to 1:10.42 (or 1 quaternary ammonium oxide:$5.48SiO_2$ to 1:20.84) in aqueous solutions containing 15% $SiO_2$ will accept from 30 to 80% of the above solvents, and such aqueous solutions containing 50% $SiO_2$ will accept from 20 to 40% of these solvents. Miscibility increases with decreasing silica concentration and ratio. It also tends to decrease in the order methanol, ethanol, isopropanol, acetone, dioxane, tetrahydrofuran. These results suggest the application of my new sodium-free quaternary ammonium silicates in paints, coatings and liquid detergent systems, for example, in which soluble silicates were never compatible heretofore.

In the foregoing specification, wherever the term "sodium" is referred to it will be understood that the result would be substantially the same when using other alkali metals such as potassium, lithium, etc.

What is claimed is:

1. An amorphous quaternary nitrogen composition having the formula:

$$X(N_nR_p^s)_2O \cdot YSiO_2 \cdot ZH_2O$$

wherein:
- $n$ is a small integer between 1 and 10;
- X, Y and Z represent numbers defining the relative amounts of each of the component parts of the compound and X is 1, Y is between 0.5 and 20, and Z is between 0 and 99, wherein from one to four R groups are associated with each N;
- R represents an organic alkyl radical that forms an NR base selected from the group consisting of alkylamines, alkanolamines, heterocyclic amines and cyclic amines which produce solutions with a pH of at least 9 and having between 1 and about 20 carbon atoms, and at least two of said organic alkyl radicals consisting of omega hydroxy alkyl groups;
- $p$ is equal to the number of R groups and is at least 4 and up to $4n$;
- $s$ is an integer from 1 to $p$, indicating the number of different R groups.

2. An amorphous sodium-free tetraethanolammonium silicate.

3. An amorphous sodium-free piperazinium silicate.

4. An amorphous sodium-free diethanol morpholinium silicate.

5. An amorphous hexaethanolethylene diammonium silicate.

6. A method for producing the compositions set forth in claim 1 by removing the alkali metal ion from alkali metal quaternary ammonium base silicate double salts by the use of a base exchange resin in the hydrogen form saturated with the quaternary ammonium base which comprises dissolving the double salt, treating the solution so obtained with the said saturated base exchange resin and then recovering the solution of amorphous alkali metal-free composition.

7. A compound according to claim 1 wherein $n$ is from one to five.

8. A compound according to claim 1 wherein at least two of said R groups are ethanol groups and the remaining of said R groups are derivatives of ethanol groups forming heterocyclic groups.

References Cited by the Examiner
UNITED STATES PATENTS

| | | | |
|---|---|---|---|
| 2,689,245 | 9/1954 | Merriel | 260—247 |
| 2,778,826 | 1/1957 | Schmidle | 260—247 |

FOREIGN PATENTS

| | | |
|---|---|---|
| 709,634 | 6/1954 | Great Britain. |

NICHOLAS S. RIZZO, *Primary Examiner.*

D. McCUTCHEN, *Examiner.*